US012482949B2

(12) United States Patent
Lee et al.

(10) Patent No.: US 12,482,949 B2
(45) Date of Patent: Nov. 25, 2025

(54) VARIABLE GAIN HORN

(71) Applicant: Keysight Technologies, Inc., Santa Rosa, CA (US)

(72) Inventors: Gregory S. Lee, Mountain View, CA (US); Gregory Eng, Santa Clara, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 261 days.

(21) Appl. No.: 18/136,424

(22) Filed: Apr. 19, 2023

(65) Prior Publication Data

US 2024/0332809 A1 Oct. 3, 2024

Related U.S. Application Data

(60) Provisional application No. 63/456,673, filed on Apr. 3, 2023.

(51) Int. Cl.
*H01Q 13/02* (2006.01)
*H01Q 1/22* (2006.01)
*H01Q 3/26* (2006.01)

(52) U.S. Cl.
CPC ............. *H01Q 13/025* (2013.01); *H01Q 1/22* (2013.01); *H01Q 3/267* (2013.01)

(58) Field of Classification Search
CPC ......... H01Q 13/025; H01Q 1/22; H01Q 3/267
See application file for complete search history.

(56) References Cited

U.S. PATENT DOCUMENTS

| | | | | |
|---|---|---|---|---|
| 5,420,597 A * | 5/1995 | Duncan | G01R 29/10 343/703 |
| 9,246,227 B2 * | 1/2016 | Cheng | H01P 5/103 |
| 9,583,840 B1 * | 2/2017 | Lawrance | H01Q 15/04 |
| 10,879,620 B2 * | 12/2020 | Tanabe | H01Q 19/13 |
| 2013/0285853 A1 * | 10/2013 | Lee | H04W 24/08 342/368 |
| 2015/0029065 A1 * | 1/2015 | Cheng | H01Q 19/06 343/753 |

FOREIGN PATENT DOCUMENTS

| | | |
|---|---|---|
| CN | 206602184 U | 10/2017 |
| JP | 2006166399 A | 6/2006 |

OTHER PUBLICATIONS

English translation of JP2006166399A, 14 pgs.
English translation of CN206602184U, 10 pgs.
(Continued)

*Primary Examiner* — Hai V Tran

(57) ABSTRACT

A variable gain horn and a system for testing an antenna with the variable gain horn is disclosed. The variable gain horn includes a horn adapted to transmit electromagnetic signals to an antenna under test. The horn is adapted to have a diverging lens attached and detached without fasteners at its distal end of the horn by a form fit. When the diverging lens is not attached, the variable gain horn transmit the electromagnetic signals at a higher directivity than when the variable gain horn with the diverging lens attached to the distal end. The system also comprises a parabolic mirror adapted to reflect the electromagnetic signals incident thereon from the variable gain horn to an antenna under test (AUT).

20 Claims, 7 Drawing Sheets

(56) References Cited

OTHER PUBLICATIONS

Yu-Hsi Tsai et al., "Fast Conical-Cut Radiation Measurement by Using Lens Fed Reflector for 5G Antenna Application at mmW Frequencies", 2018 IEEE International Symposium on Electromagnetic Compatibility and 2018 IEEE Asia-Pacific Symposium on Electromagnetic Compatibility (EMC/APEMC), pp. 382-386.
Vince Rodriguez et al., "Extending the Quiet Zone Using an RF Lens on a Conical Tapered Chamber to 18 GHZ", Microwave Journal, Oct. 14, 2014, pp. 1-13.

* cited by examiner

VARIABLE GAIN HORN

CROSS-REFERENCE TO RELATED APPLICATION

The present application claims priority under 35 U.S.C. § 119(e) to U.S. Provisional Application No. 63/456,673 filed on Apr. 3, 2023. The entire disclosure of U.S. Provisional Application No. 63/456,673 is specifically incorporated herein by reference in its entirety.

BACKGROUND

Mobile communications are ubiquitous and ever evolving, allowing not only communications between people, but also connectivity to the internet to name only a couple applications.

Currently, mobile systems under the so-called sixth generation (6G) protocols are being investigated with anticipated deployment in the next decade. Devices operating at 6G frequencies will function well above 100 GHz. Testing over the air (OTA) devices under test (DUT's) at these frequencies, especially in so-called compact antenna test ranges (CATR), using current test methods often involves a compromise between achieving a large so-called quiet zone (QZ) and achieving a high signal-to-noise ratio (SNR).

Testing of antennae comprises so-called far-field testing in which an amplitude/phase-flat spatial test zone covers the extent of one or more antenna arrays being tested. This, in turn, requires a comparatively large QZ. Unfortunately, providing this comparatively large QZ diminishes the intensity of the test millimeter-wave field provided by a CATR, thus reducing SNR. At sub-terahertz test frequencies (e.g., D band, G band, Y band, J band, etc.), which will likely be implemented as further generations of communications protocols are investigated and deployed, the impact can be so severe that SNR can drop to nearly 0 dB in many cases, which of course is unacceptable when testing devices to be used with emerging protocols. Moreover, signal transmission and reception at these comparatively high frequencies suffer from low dynamic range, compared to communications at lower frequencies. As a result, at even moderate path distances of propagation over the air, there is enough radiation loss that the SNR becomes unacceptably low.

Furthermore, certain near field testing systems are known to achieve a comparatively high SNR due to the proximity of the near field probe to the antenna under test (AUT). Such systems are quite popular at frequencies of 6 GHz and below. It is known, however, that meaningful near field to far field transformation, which all such systems perform mathematically, depends on comparatively accurate near-field phase measurements. Far field sidelobe details are extremely sensitive to phase errors in the near field where errors on the order of 5° C. an throw off the sidelobe forecast. At sub-terahertz frequencies, this implies that longitudinal position errors on the order of 10 microns can have impact as far as weak sidelobes are concerned. Accordingly, placement of the antennae used to evaluate an AUT must be accurately placed and not moved during testing. In principle, one can take a CATR and swap feedhorns to switch between large QZ and large SNR. A feedhorn with low directivity ("low-gain horn") can be used to fully illuminate the CATR main mirror to achieve a large QZ. Conversely, a feedhorn with high directivity ("high-gain horn") can be used to illuminate a small portion of the mirror. In turn, this results in a smaller diameter collimated beam (smaller QZ) with higher intensity, resulting in a higher SNR. Unfortunately, the feedhorn is usually located deep inside the dark CATR anechoic chamber, and swapping the low-gain horn for the high-gain horn, and vice-versa using known structures requires removal and reattachment of the tiny screws which are standard for mating waveguide flanges. This can be particularly difficult to carry out in the dark anechoic chambers, and with the comparatively small fasteners needed. Moreover, in the process of replacing one horn by another, the flanges may not be flush and/or the position of the replacement horn can be incorrect, resulting in undesirable measurement errors. Furthermore, the in the process of fastening and removing one horn from another, the position of the horn can be moved out of location, can also result in undesirable measurement errors Accordingly, not only is the switching of horns in known test systems cumbersome, time-consuming, and nonergonomic, but also the accuracy of the test may be deleteriously impacted during the process.

What is needed, therefore, is an apparatus and system of testing communications devices that overcome at least the drawbacks of the known apparatuses and systems described above.

BRIEF DESCRIPTION OF THE DRAWINGS

The representative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
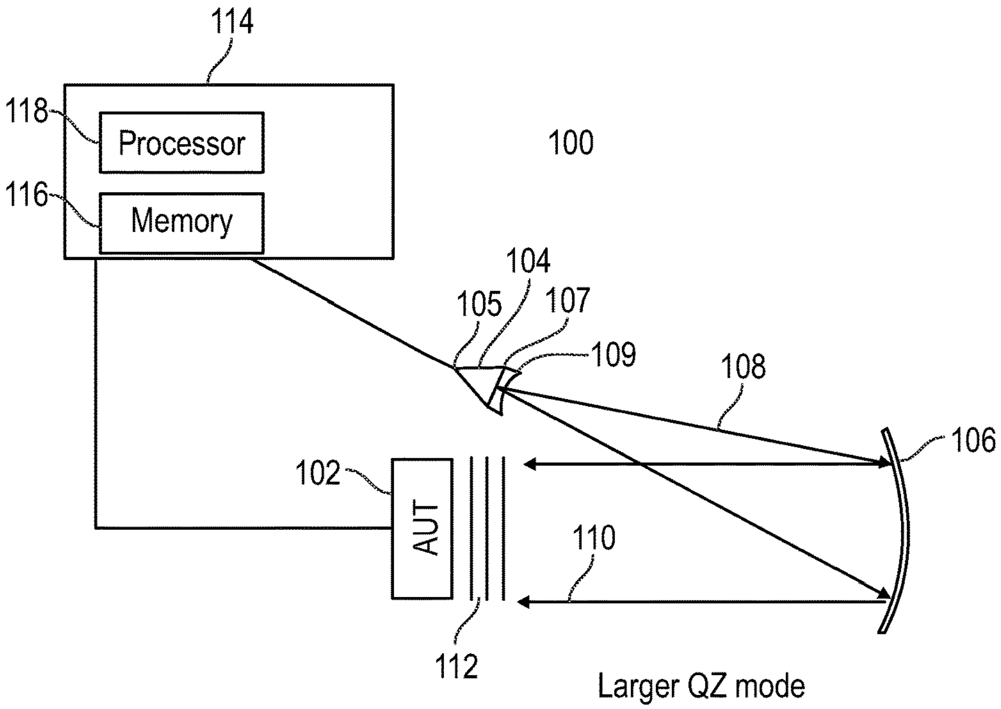
FIG. 1A is a simplified schematic block diagram of a CATR system comprising a variable gain horn according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

In a general sense, the present teachings relate to a system for testing an AUT or similar DUT, and a variable gain horn that is easily and conveniently changed during testing of an AUT or similar DUT. In a first mode of operation, the variable gain horn provides emulation signals with comparatively low directivity ("low-gain horn") to fully illuminate the CATR main mirror to achieve a comparatively large QZ; and in a second mode with the feedhorn with high directivity ("high-gain horn") can be used to illuminate a small portion of the mirror. Operation in the second mode results in a smaller diameter collimated beam (smaller QZ) with higher intensity, resulting in a higher SNR. Beneficially, switching between the first and second modes of operation requires the simple detachment and attachment of a diverging lens on a distal end of a feedhorn (referred to herein simply as the horn), and without the need for external fasteners (e.g., screws) that are not only cumbersome and difficult to apply and remove, but also plague known devices with measurement errors due to undesired movement of the feedhorn during the switch from low-gain (high QZ/low SNR) to high-gain (low QZ/high SNR) during testing of the AUT. Generally, and among other beneficial aspects of the variable gain horn of the present teachings provides a useful and improvement to the field of OTA measurement and testing systems, devices and methods. Additionally, the variable gain horn of the present teachings provides an improvement in the field of electromagnetic waveguides. Moreover, the variable gain horn of the present teachings provides a practical application of being adapted to change from a first mode of testing (i.e., the so-called low SNR/high QZ mode) to a second mode of testing (i.e., the so-called high SNR/low QZ mode) easily and accurately because no external fasteners (e.g., screws) are needed to make the change between the first and second modes.

In accordance with one aspect of the present teachings, a variable gain horn is disclosed. The variable gain horn comprises: a horn adapted to transmit electromagnetic signals to an antenna under test. The horn comprises a proximal end adapted to receive the electromagnetic signals and a distal end adapted to transmit the electromagnetic signals. The variable gain horn also comprises a diverging lens adapted to be attached to the distal end of the horn by a form fit. When the diverging lens is not disposed at the distal end of the horn, the variable gain horn without the diverging lens attached to the distal end transmits the electromagnetic signals at a higher directivity than when the variable gain horn with the diverging lens attached to the distal end.

In accordance with another aspect of the present teachings, a system for testing an antenna comprises a variable gain horn is disclosed. The variable gain horn comprises: a horn adapted to transmit electromagnetic signals to an antenna under test. The horn comprises a proximal end adapted to receive the electromagnetic signals and a distal end adapted to transmit the electromagnetic signals. The variable gain horn also comprises a diverging lens adapted to be attached to the distal end of the horn by a form fit. When the diverging lens is not disposed at the distal end of the horn, the variable gain horn without the diverging lens attached to the distal end transmits the electromagnetic signals at a higher directivity than when the variable gain horn with the diverging lens attached to the distal end. The system also comprises a parabolic mirror adapted to reflect the electromagnetic signals incident thereon from the variable gain horn to an antenna under test (AUT).

Figure 1B:
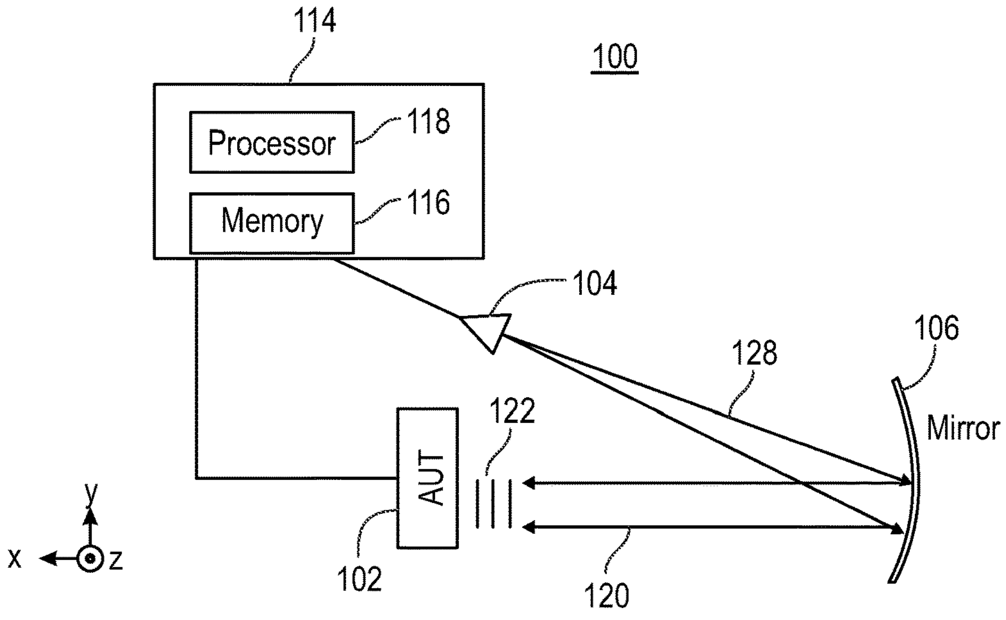
FIG. 1B is a simplified schematic block diagram of a CATR system comprising a variable gain horn according to a representative embodiment according to another representative embodiment.
Figure 1C:
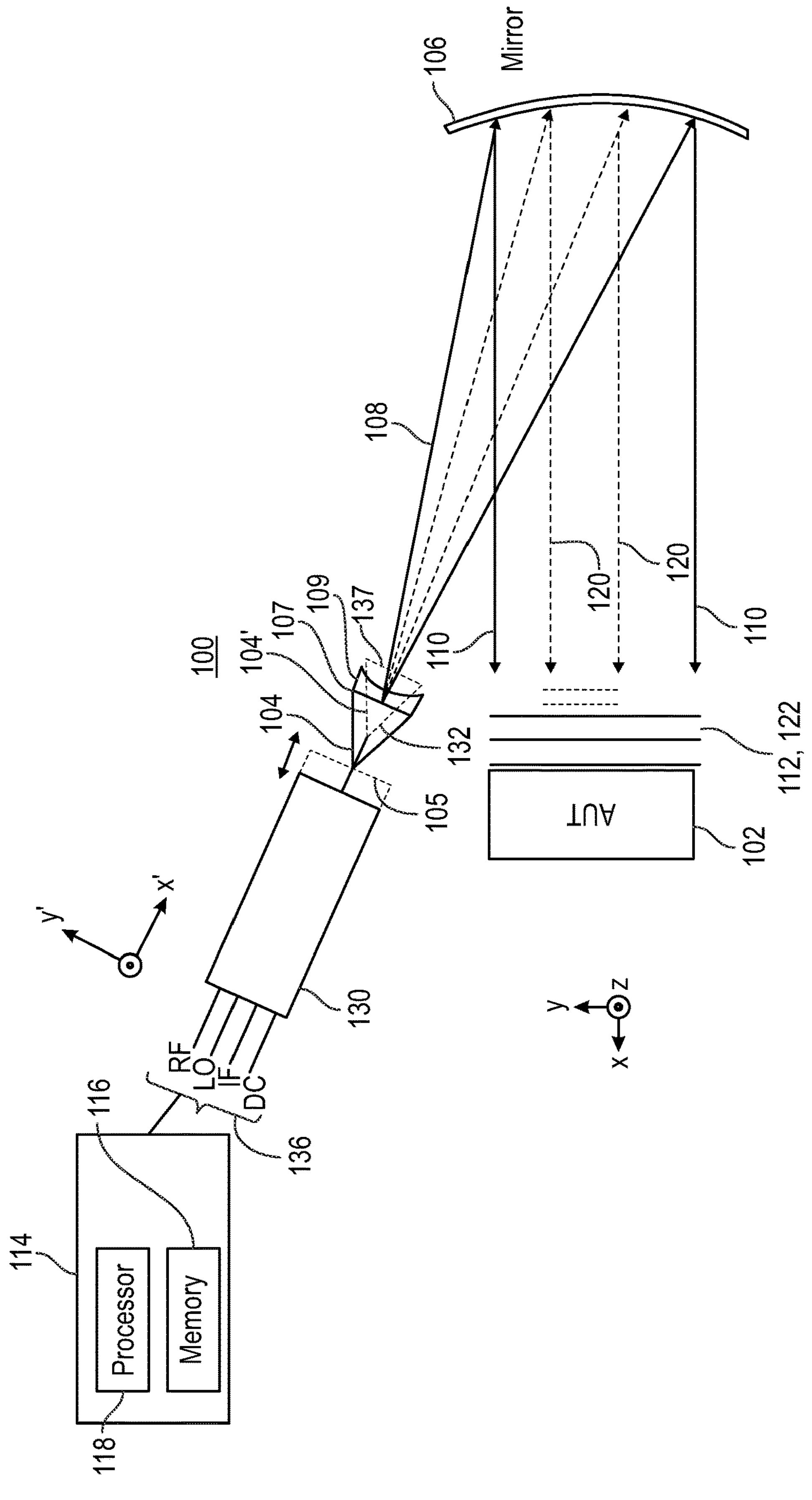
FIG. 1C is a simplified schematic block diagram of a CATR system comprising a variable gain horn according to a representative embodiment according to another representative embodiment.

FIGS. 1A-1C are simplified block diagrams showing a system 100 for emulating echo signals for an antenna under test (AUT) 102 according to a representative embodiment. As will be appreciated by one of ordinary skill in the art having the benefit of the present disclosure, among other applications, the present teachings contemplate testing antennae including phased arrays in a CATR test set up at frequencies in the so-called Generation 6 cellular communications band in which devices function well above 100 GHz, including sub-terahertz test frequencies, e.g., D band, G band, Y band, J band. However, it is emphasized that the presently described system 100 is not limited to testing systems and devices in the illustrative bands, and can be applied to testing communications systems and devices operating at other frequencies as the features, benefits and advantages may be applicable to the testing of other antennae.

In accordance with a representative embodiment shown in FIGS. 1A-1C, the system 100 is arranged to test an antenna under test (AUT) 102. The AUT 102 may comprise a single antenna or a plurality of antennae. To this end, the AUT may comprise a phased antenna array (phased array) comprising a plurality of antennae to be tested. While the present description notes the adaptability of the variable gain horn to be switched easily and conveniently between low-gain mode and a high gain mode comparatively easily and without significantly adversely impacting the accuracy of the measurement, the ability to easily select a mode of operation provides other attendant benefits. For example, and as will become clearer as the present description continues, the AUT may comprise sections of different antenna arrays (e.g., a phased array) that are tested incrementally using the variable gain horn in the high-gain testing mode across the individual channels of the phased array by movement of the AUT, and then tested in a low-gain mode across the entire area of the AUT.

The system 100 comprises and the AUT 102. The system 100 also comprises a controller 114 comprising a memory 116 and a processor 118. Notably, but not necessarily, the controller 114 may be a component of a system test device commonly used in OTA testing such as the AUT testing contemplated by the present teachings. Just by way of example, the system test device that comprises the controller 115 may be a network analyzer such as one commercially available from Keysight Technologies, Santa Rosa, CA USA.

The controller 114 may be implemented as a processing unit. In various embodiments, the processing function of the controller 114 may be carried out using one or more computer processors (e.g., processor 118 described below), digital signal processors (DSP), field-programmable gate arrays (FPGAs), application specific integrated circuits (ASICs), or combinations thereof, using any combination of hardware, software, firmware, hard-wired logic circuits, or combinations thereof. The controller 114 may include its own processing memory (e.g., memory 116) for storing computer executable code (e.g., software, software modules) that enables performance of the various functions described herein. For example, the memory 116 may store software instructions/computer executable code executable by the processor 11 for performing some or all aspects and details of methods described herein, including various steps of the methods of emulating targets described in connection with the representative embodiments of FIGS. 1C, 2A and 2B. That is, execution of the instructions/computer executable code generally causes the processor 118 and/or the controller 114 to provide signals from a source (e.g., from the test device (not shown)) that are incident on the AUT 102 to evaluate the performance of the AUT 102. In certain other embodiments, the instructions cause the processor to move the variable gain horn to be optimally located during testing, such as described more fully below in connection with FIG. 1C. Memory 116 may be RAM, ROM, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, blu-ray disk, or universal serial bus (USB) driver, or any other form of storage medium known in the art, which are tangible and non-transitory computer readable storage media (e.g., as compared to transitory propagating signals). Memories may be volatile or non-volatile, secure and/or encrypted, unsecure and/or unencrypted, without departing from the scope of the present teachings.

The system 100 also comprises a computer (not shown). The computer may be a component of the test device (e.g., network analyzer) or may be connected to the test device to carry out various tests of the AUT contemplated by the present teachings. The computer illustratively comprises the controller 114. To this end, as noted above, among other functions, the computer may be used to optimally locate the variable gain horn during testing in addition to controlling the function of the AUT 102 during testing. Notably, the various functions carried out by the computer are done by execution of instructions stored in memory 116 by the processor 118. The controller 114 may be housed within or linked to a workstation such as the computer (not shown) or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling an application of various principles as described in the present disclosure. The structural configuration of the controller may include, but is not limited to, processor(s), computer-usable/computer readable storage medium(s), an operating system, application module(s), peripheral device controller (s), slot(s) and port(s).

Additionally, although the computer may be shown as components networked together, two such components may be integrated into a single system. For example, the computer may be integrated with a display (not shown) and/or with the system 100. That is, in some embodiments, functionality attributed to the computer may be implemented by (e.g., performed by) the system 100. On the other hand, the networked components of the computer may also be spatially distributed such as by being distributed in different rooms or different buildings, in which case the networked components may be connected via data connections. In still another embodiment, one or more of the components of the computer is not connected to the other components via a data connection, and instead is provided with input or output manually such as by a memory stick or other form of memory. In yet another embodiment, functionality described herein may be performed based on functionality of the elements of the computer but outside the system 100.

The processor is tangible and non-transitory and is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 118 of the present teachings is an article of manufacture and/or a machine component. The processor 118 for the controller 114 is configured to execute software instructions to perform functions as described in the various embodiments herein. The processor 118 may be a general-purpose processor or may be part of an application specific integrated circuit (ASIC). The processor 118 may also be (or include) a microprocessor, a microcomputer, a processor chip, a controller, a microcontroller, a digital signal processor (DSP), a state machine, or a programmable logic device. The processor 118 may also be (or include) a logical circuit, including a programmable gate array (PGA) such as a field programmable gate array (FPGA), or another type of circuit that includes discrete gate and/or transistor logic. The processor 182 may be a central processing unit (CPU), a graphics processing unit (GPU), or both. Additionally, the processor 118 may comprise multiple processors, parallel processors, or both. Multiple processors may be included in, or coupled to, a single device or multiple devices.

The memory 116 may comprise a main memory or a static memory, or both, where the memories may communicate with each other via a bus (not shown). The memory 116 described herein comprise tangible storage mediums that can store data and executable instructions and are non-transitory during the time instructions are stored therein. As used herein, the term "non-transitory" is to be interpreted not as an eternal characteristic of a state, but as a characteristic of a state that will last for a period. As such, the present teachings also encompass a tangible, non-transitory computer readable medium that stores instructions that cause a processor or processing system to execute instructions/algorithms described herein. A non-transitory computer readable medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system.

The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

Turning to FIG. 1A, the system 100 is shown with the variable gain antenna in a first mode of operation, which is a low gain, high QZ mode of operation. Various aspects and details of the system 100 discussed above are common to the description of FIG. 1A and may not be repeated to avoid obscuring the presently described representative embodiments.

In FIG. 1A, the variable gain horn comprises a feedhorn (horn) 104 comprising a proximal end 105 and a distal end 107. A diverging lens 109 is disposed over the distal end 107 of the horn 104. As described more fully below, the diverging lens 109 is connected to the distal end 107 without the use of additional fastener such as screws. Rather the diverging lens 109 is fit over and/or friction the distal end of the horn 104.

In the first mode of operation shown in FIG. 1A, signals 108 from the test device are provided by the controller 114 to the horn 104 and by the function of the diverging lens 109 are incident over a wider areal region of a parabolic mirror 106. The parabolic mirror 106 then illustratively reflects and substantially collimates the incident electromagnetic wave from the source to provide reflected signal 110. As shown at 112 the reflected signal 110 has a comparatively flat wave front that is incident on the AUT 102. The received signals at the AUT 102 are then provided to the controller 114 for further review in analysis.

As will be appreciated, and among other applications, this first mode of testing may be used to test the far field characteristics and performance in the real-life situations/the field. Just by way of illustration, consider the AUT 102 is a phased antenna array. Phased arrays comprise a plurality of channels, and in this first mode of testing, a comparatively reduced signal intensity is incident thereon. However, because the reflected signal 110 is substantially a full planewave fashion testing of the far field behavior of each of the channels of the phased array is more accurately emulated.

Turning to FIG. 1B, the system 100 is shown with the variable gain horn in a second mode of operation, which is a high gain, low QZ mode of operation. Various aspects and details of the system 100 discussed above are common to the description of FIG. 1B and may not be repeated to avoid obscuring the presently described representative embodiments.

In FIG. 1B, the variable gain horn comprises a feedhorn (horn) 104 does not include the diverging lens 109 at its distal end 107. In this mode of operation, the signals from the test device emulate a near field scenario, which may be useful in a variety of tests. As such, in this mode of operation, the diverging lens 109 has been removed from distal end 107 without the need to remove additional fasteners such as screws, which as noted above, is not desired in situ.

In the second mode of operation shown in FIG. 1B, signals 128 from the test device are provided by the controller 114 to the horn 104 are incident over a narrower areal region of a parabolic mirror 106. The parabolic mirror 106 then illustratively reflects and substantially collimates the incident electromagnetic wave from the source to provide reflected signal 120. As shown at 122 the reflected signal 120 has is then incident on a comparatively small area of the AUT 102. The received signals at the AUT 102 are then provided to the controller 114 for further review in analysis.

The second mode of operation shown in FIG. 1B not only provides testing of the near-field performance of the AUT 102, but also allows for selective testing of areas of the AUT where the reflected signal 120 is incident on the AUT 102. Just by way of example, in certain contemplated representative embodiments, the AUT 102 may be a phased array comprising a collection of so-called sub-arrays or a plurality of channels over the areal dimension of the AUT 102. These sub-arrays may function independently or at different times during signal reception. Moreover, these entire areal dimension of the AUT 102 may not comprise antennae or sub-arrays of antennae. As such, the ability to concentrate the reflected signal 120 in a particular areal portion of the AUT 102 has many advantages and benefits.

In accordance with a representative embodiment, the testing of particular areal portions of the AUT 102 is effected by moving the AUT 102, rather than moving the horn 104 or the parabolic mirror 106. As such, and just by way of illustration, the AUT 102 may be moved in the ±y-direction or in the ±z direction of the coordinate system shown in FIG. 1B.

The ability to concentrate the reflected signal 120 selectively on a particular area of the AUT 102 allows for the testing of particular areas of the AUT 102, and thereby selectively testing of sub-arrays or channels of the phased array of the AUT, or more generally, to test certain areas selectively over time. As such, and among other applications and benefits, testing the AUT 102 in this second mode provides many options including testing individual sections/sub-arrays of antennae at different times or at different regions of the AUT 102, or both. Accordingly, the ability to easily remove the diverging lens 109 from the proximal end 105 of the horn 104 without having to remove fasteners, and without impacting the accuracy of the test by inadvertent movement of the horn 104, provides further ability to test the AUT 102 for various characteristics.

FIG. 1C is a simplified schematic block diagram of a CATR system comprising a variable gain horn according to a representative embodiment according to another representative embodiment. Various aspects and details of the system 100 discussed above are common to the description of FIGS. 1A and 1B, and may not be repeated to avoid obscuring the presently described representative embodiments.

Turning to FIG. 1C, the system 100 is shown with the horn 104 in one location in the first mode of operation, which is a low gain, high QZ mode of operation and with the diverging lens 109 attached to the horn; and in another location the horn 104' (shown in dotted line) in the second mode of operation, which is a high gain, low QZ mode of operation with the diverging lens 109 not attached to the horn 104'. As described more fully below, the focal point of the diverging lens 109 is located at point 134 in the first mode of operation, and at point 132 in the second mode of operation.

In FIG. 1C, the variable gain horn comprises the horn 104' (in dotted line) comprising a proximal end 105 and a distal end 107. In the second mode of operation the diverging lens 109 is disposed over the distal end 107 of the horn 104. As described more fully below, the diverging lens 109 is connected to the distal end 107 without the use of additional fastener such as screws. Rather the diverging lens 109 is fit over and/or friction fit to the distal end 107 of the horn 104.

In the first mode of operation, signals 108 from the test device are provided by the controller 114 to the horn 104 and by the function of the diverging lens 109 are incident over a wider areal region of a parabolic mirror 106. The parabolic mirror 106 then illustratively reflects and substantially collimates the incident electromagnetic wave from the source to provide reflected signal 110. As shown at 112 the reflected signal 110 has a comparatively flat wave front that is incident on the AUT 102. The received signals at the AUT 102 are then provided to the controller 114 for further review in analysis.

In the second mode of operation, signals 128 from the test device are provided by the controller 114 to the horn 104 are incident over a narrower areal region of a parabolic mirror 106. The parabolic mirror 106 then illustratively reflects and substantially collimates the incident electromagnetic wave from the source to provide reflected signal 120. As shown at 122 the reflected signal 120 has is then incident on a comparatively small area of the AUT 102. The received signals at the AUT 102 are then provided to the controller 114 for further review in analysis.

The system 100 further comprises an extender head 130 having cables connected from an input 136 to a radio frequency (RF) input, a local oscillator (LO) input, an intermediate frequency (IF) input and a DC input. The extender head 113 is connected to the variable gain horn by a signal transmission line (not shown) such as a rigid waveguide (not shown).

Instructions stored in memory 116 and executed by the processor 114 are adapted to move the extender head 130 along the x' axis of the second coordinate system of FIG. 1C to point 134 in the first mode of operation, and to point 132 in the second mode of operation. Notably, movement of the extender head 130 is not necessarily limited to movement along the x' direction. Rather, the present teachings contemplate movement along the z' axis, or along the γ' axis, or combinations thereof to locate the variable gain horn at the proper position for reasons discussed below.

Figure 2A:
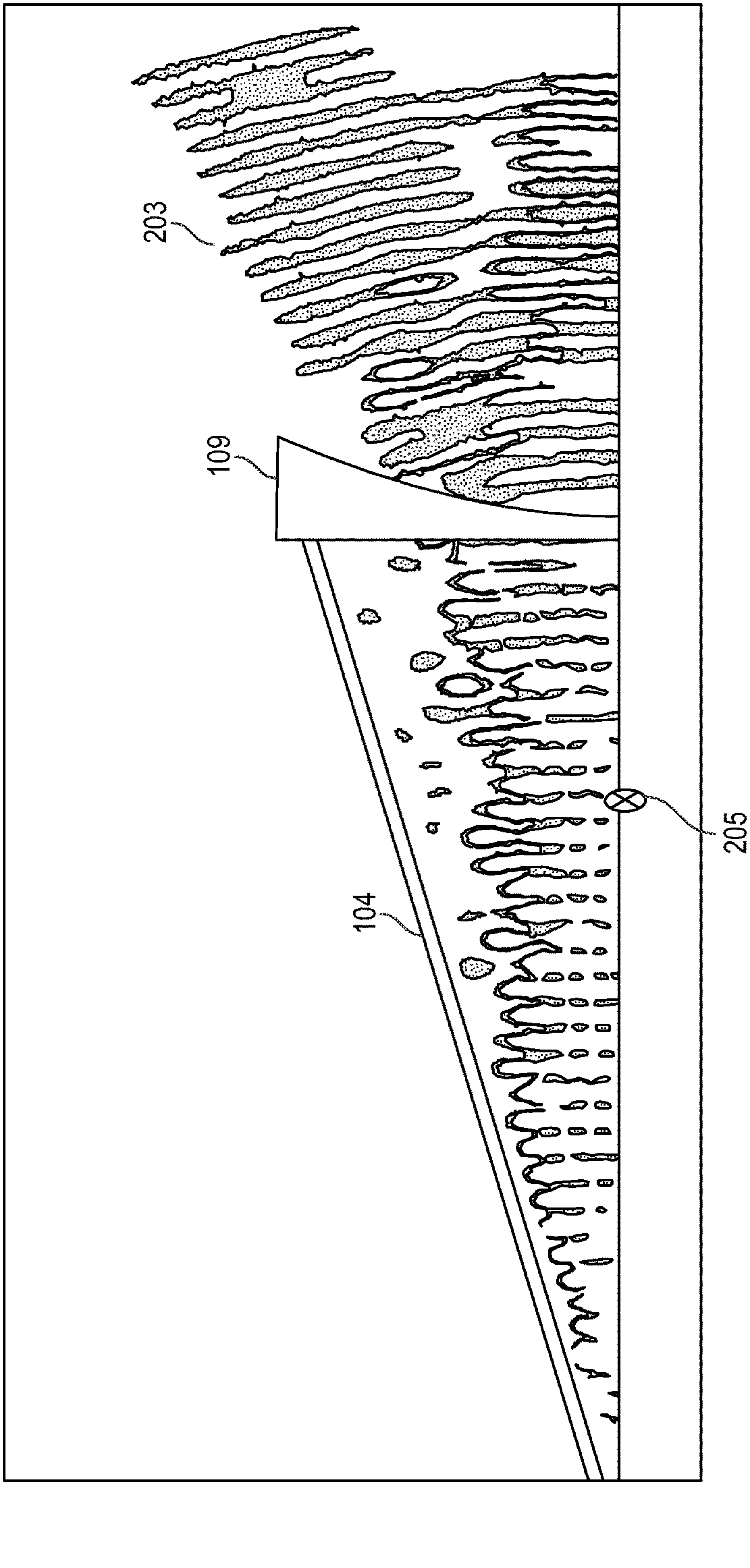
FIG. 2A shows a simulation of electromagnetic emanating wavefronts from the variable gain horn when the diverging lens is attached to the distal end of the horn in accordance with a representative embodiment.

FIG. 2A shows a simulation of electromagnetic emanating wavefronts from one half of the variable gain horn when the diverging lens is not attached to the distal end of the horn in accordance with a representative embodiment. Various aspects and details of discussed above in connection with FIGS. 1A-1C are common to the description of the presently described embodiments and may not be repeated to avoid obscuring the presently described representative embodiments.

In the example of FIG. 2A, the diverging lens is not attached to the distal end 107 of the horn. In this second mode of operation, the emanating electromagnetic fields 202 (emanating wavefronts) leave the proximal end 105 of the horn 104 (sometime called the throat of the horn 104) with less radius of curvature than the emanating wavefronts shown in FIG. 2B. As will be appreciated, this provides electromagnetic waves that are more concentrated leaving the proximal end 105 of the horn than the waves leaving the diverging lens as described below. As such, the high-gain mode of operation is fostered by the ability to remove the diverging lens 109 with ease (and without the need for fasteners as discussed herein).

A center 204 of the radiating feed of the horn 104 without the diverging lens 109 attached to the proximal end 105 of the variable gain horn is shown. Locating the focal point of the parabolic mirror 106 at the center 204 of the radiating feed (in this case the horn 104) beneficially provides improved collimation and thereby an increased flat-phase QZ in the first mode of operation. Referring again to FIG. 1C, in the first mode of operation, therefore, the focal point (and the center feed of the radiating feed) of the parabolic mirror 106 are located at 132. As such, by the present teachings, this movement of the extender head 130 to locate the center 204 of the radiating feed facilitates realizing the desired shape and concentration of the emanating electromagnetic field 202 for operation in the first mode.

Figure 2B:
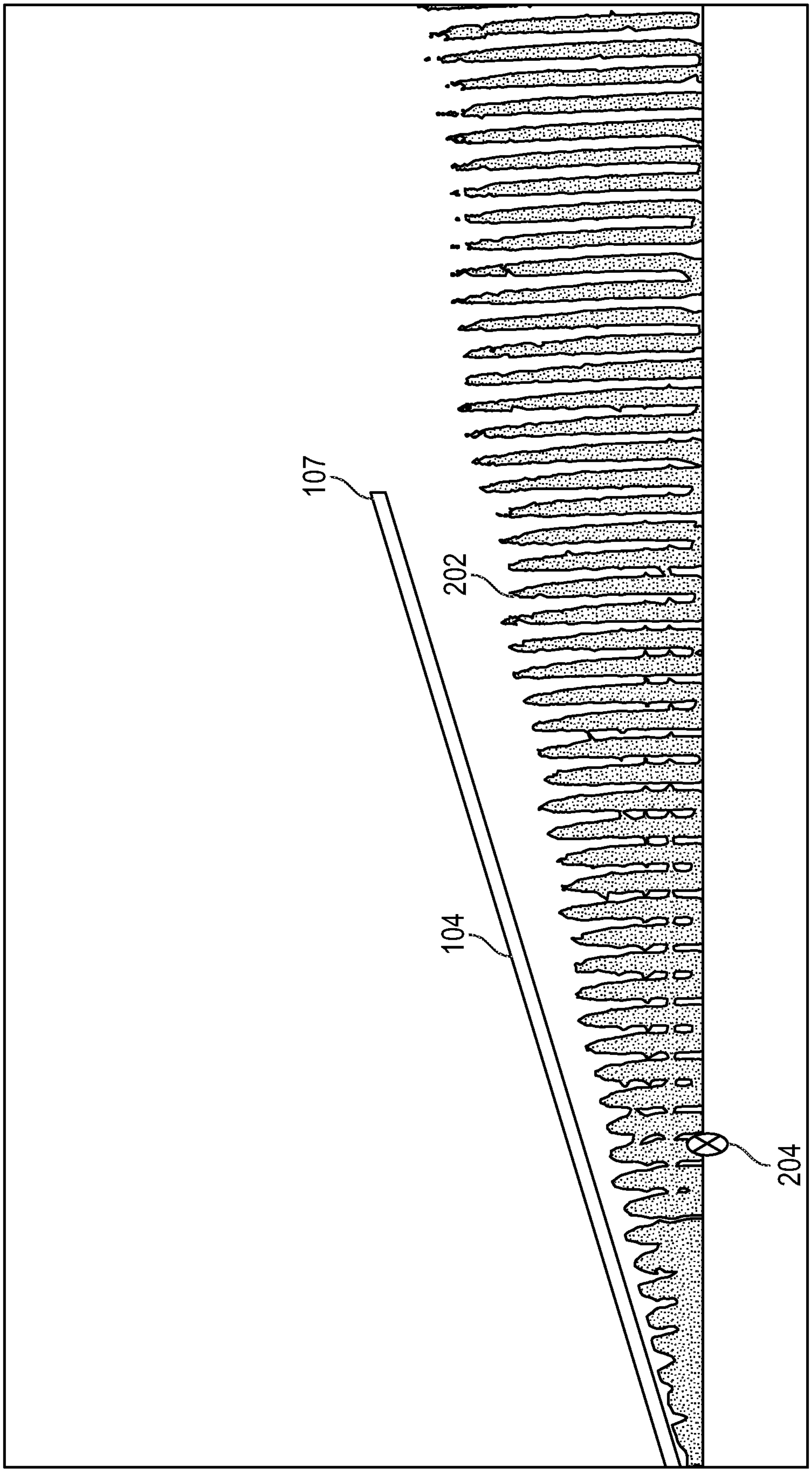
FIG. 2B shows a simulation of electromagnetic emanating wavefronts from the variable gain horn and when the diverging lens is not attached to the distal end of the horn according to a representative embodiment.

FIG. 2B shows a simulation of electromagnetic emanating wavefronts from one half of the variable gain horn with the diverging lens 109 attached and when the diverging lens is not attached to the distal end of the horn according to a representative embodiment. Various aspects and details of the system 100 discussed above are common to the description of FIGS. 1A-2A and may not be repeated to avoid obscuring the presently described representative embodiments.

In the example of FIG. 2B, the diverging lens 109 is attached to the distal end 107 of the horn 104. In this first mode of operation, the emanating wavefronts 203 leave the proximal end 105 are refracted by the diverging lens 109 and have a greater radius of curvature than the emanating wavefronts shown in FIG. 2C. As will be appreciated, this provides electromagnetic waves that are less concentrated leaving the diverging lens 109 than the waves leaving the horn 104 as described. As such, the low-gain mode, higher QZ mode of this first mode operation provides the less concentration large planar wave incident on the AUT 102 and is fostered by the ability to remove the diverging lens 109 with ease (and without the need for fasteners as discussed herein).

A center 205 of the radiating feed of the horn 104 with the diverging lens 109 attached to the proximal end 105 of the variable gain horn is shown. Locating the focal point of the parabolic mirror 106 at the center 205 of the radiating feed (in this case the horn 104) beneficially provides improved collimation and thereby an increased flat-phase QZ in the first mode of operation. Referring again to FIG. 1C, in this first mode of operation, therefore, the focal point (and the center feed of the radiating feed) of the parabolic mirror 106 is located at 134. As such, by the present teachings, this movement of the extender head 130 to locate the center 205 of the radiating feed at the focal point of the parabolic mirror facilitates realizing the desired shape and concentration of the emanating electromagnetic field 202 for operation in the first mode.

Referring again to the representative embodiments of FIGS. 1A and 1B, if the horn 104 is not translated when the diverging lens 109 is removed, and the focal point of the parabolic mirror will formally not necessarily be located at the phase center of the radiating field as desired. In many instances, the depth of focus increases in the case of high directivity (high SNR/low QZ mode). For a typical 12 dB of directivity difference between high gain mode and the low gain mode, the high-gain mode enjoys approximately 16× the depth of focus. As such, locating the phase center of the radiating feed when switching to the high gain mode is not imperative. However, through the translation of the horn 104/104' described in connection with FIG. 1C, better performance can be realized.

Figure 3:
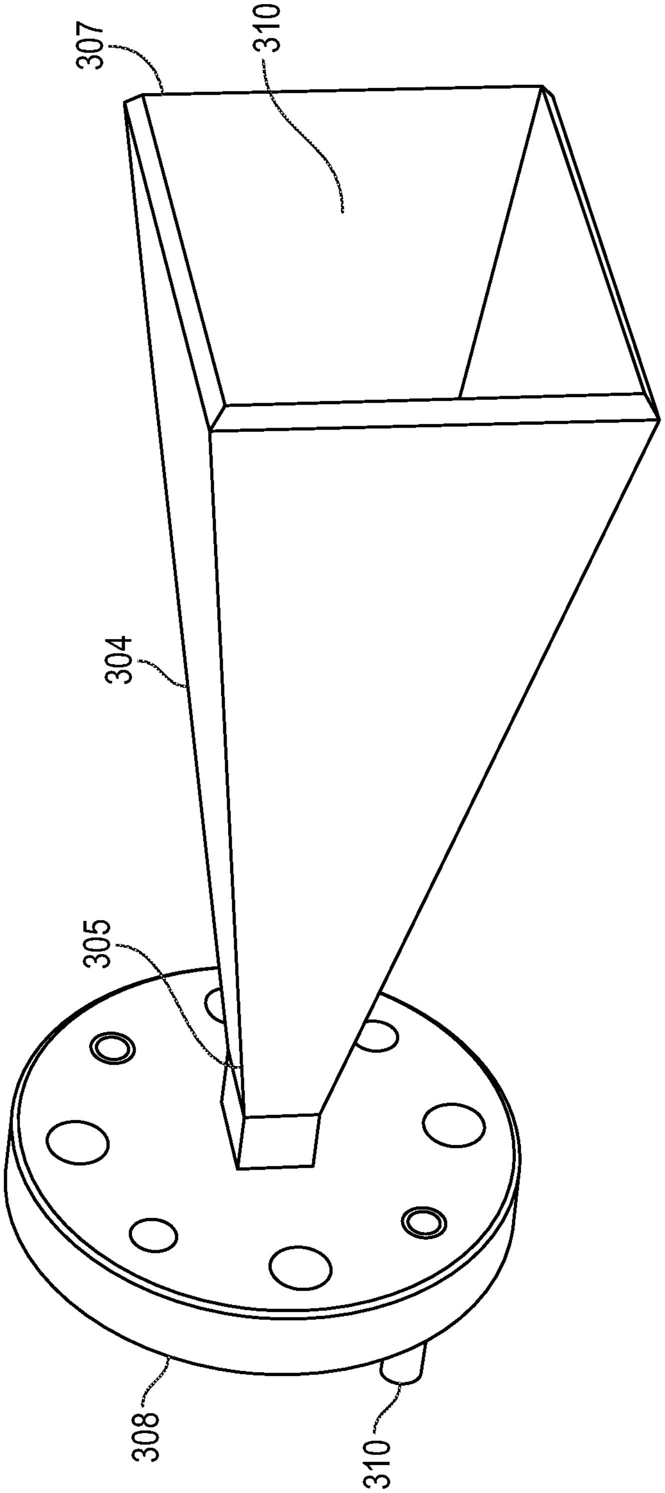
FIG. 3 is a perspective view of a variable gain horn without a diverging lens connected to a distal end of a horn according to a representative embodiment.

FIG. 3 is a perspective view of a variable gain horn without a diverging lens connected to a distal end of a horn according to a representative embodiment. Various aspects and details of discussed above in connection with FIGS. 1A-2B are common to the description of the presently described embodiments and may not be repeated to avoid obscuring the presently described representative embodiments.

As shown in FIG. 3, a horn 304 has a proximal end 305 and a distal end 307. The proximal end 305 is connected to a mount 308 and a feeder waveguide 309 connects the horn 304 to the source of the signals under test (not shown). At the proximal end 305, the horn 304 has an opening 310 having a shape and an areal dimension. In the present representative embodiment, the shape is square. This is merely illustrative and the shape at the opening 310 is contemplated to be other than square depending on the desired characteristics of the horn. As will be appreciated by one of ordinary skill in the art, in certain representative embodiments the horn 304 comprises a metal or an alloy. Other materials suitable for the horn 304 within the purview of one of ordinary skill in the art are contemplated.

Figure 4:
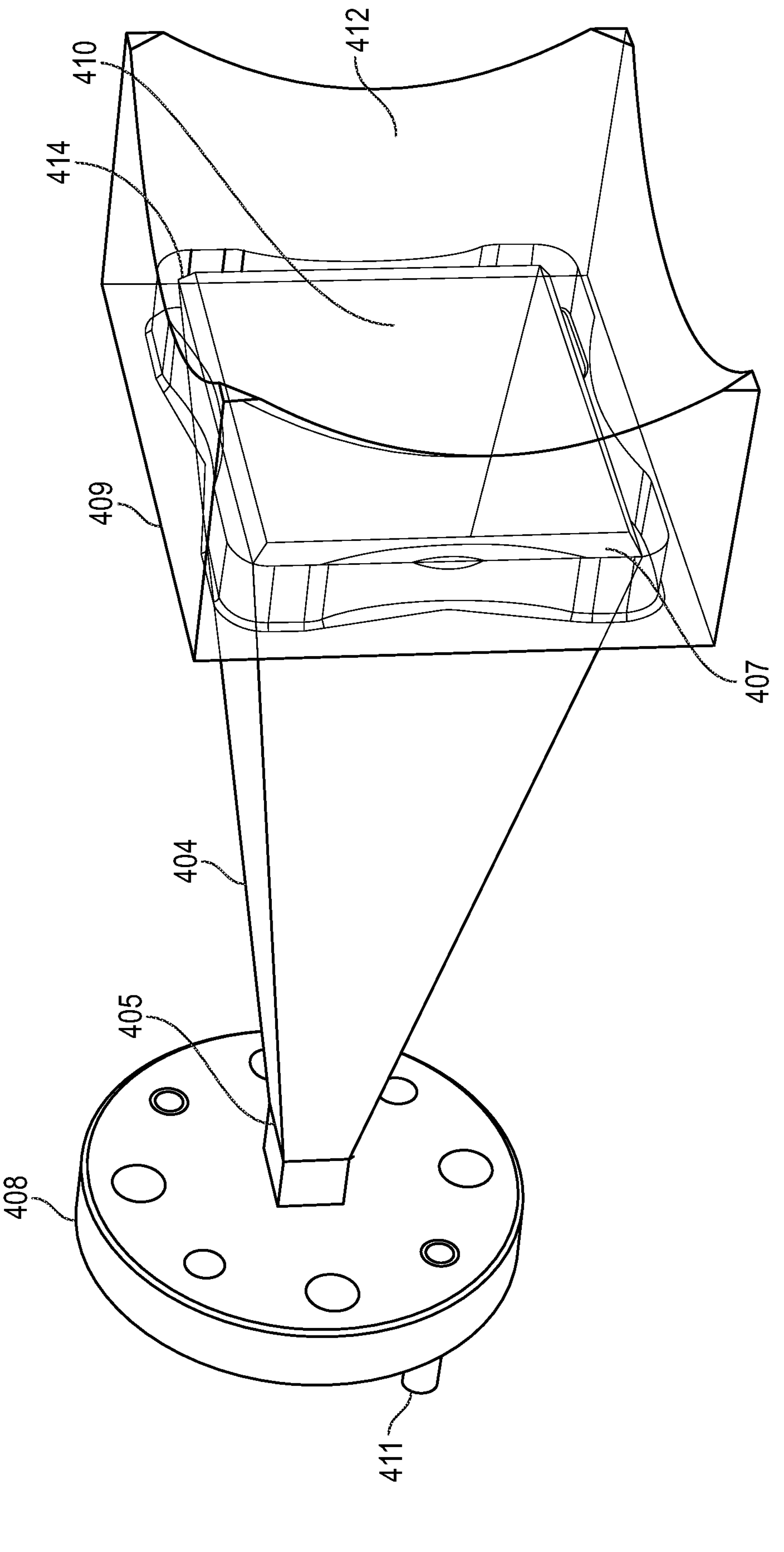
FIG. 4 is a perspective view of a variable gain horn with a diverging lens connected to a distal end of a horn according to a representative embodiment.

FIG. 4 is a perspective view of a variable gain horn with a diverging lens connected to a distal end of a horn according to a representative embodiment. Various aspects and details of discussed above in connection with FIGS. 1A-3 are common to the description of the presently described embodiments and may not be repeated to avoid obscuring the presently described representative embodiments.

As shown in FIG. 4, a horn 404 has a proximal end 405 and a distal end 407. The proximal end 405 is connected to a mount 408 and a feeder waveguide 411 connects the horn 404 to the source of the signals under test (not shown). At the proximal end 405, the horn 404 has an opening 410 having a shape and an areal dimension. In the present representative embodiment, the shape is square. This is merely illustrative and the shape at the opening 410 is contemplated to be other than square depending on the desired characteristics of the horn 404. Again, and as will be appreciated by one of ordinary skill in the art, in certain representative embodiments the horn 404 comprises a metal or an alloy. Other materials suitable for the horn 304 within the purview of one of ordinary skill in the art are contemplated. A diverging lens 409 having a concave region 412 is disposed over the opening 410 of the horn 404. Specifically, the distal end 407 of the horn 404 is disposed in a cavity 414 and is form fit (also known as friction fit) to the cavity 414. As will be appreciated, the distal end 407 of the horn 404 has shape adapted to fit into the cavity. As shown below, the shape of the outline of the cavity 414 may be similar to the shape of the opening 410 of the horn 404. In other representative embodiments, the shape of the outline of the cavity 414 is substantially the same as the shape of the opening 410 at the distal end 407 of the horn 404 is adapted to fit snugly (i.e., friction fit) into the cavity 414.

The present teachings contemplate a number of materials for use as the diverging lens 409. For example, plastics including various nylons (e.g., nylon-6, nylon-66, nylon-11, nylon-12, etc.), Delrin (acetal homopolymer (Polyoxymethylene POM)), PEEK (polyetheretherketone) are contemplated for use in making the diverging lens 409. If thicker lenses are contemplated, other plastics such as acrylic, polycarbonate, polystyrene may be used, as are other plastics that are adaptable to machining during fabrication. Materials amenable to low-cost 3D printing, including, but not limited to nylon-12, nylon-11, nylon-6, acrylic and polycarbonate are contemplated for use in making the diverging lens 409. Notably, 3D printing tolerances are quite adequate with visible concentric rings (not shown) on the face 412 of the diverging lens 409 displaced from each other by steps$\leq\lambda/10$, where $\lambda$ is the central operating wavelength, c is the speed of light in vacuum, and f is the central operating frequency (e.g., 140 GHz). Various glasses could also be used to fabricate the diverging lens 409, allowing for a thinner lens due to higher available dielectric constants.

Figure 5:
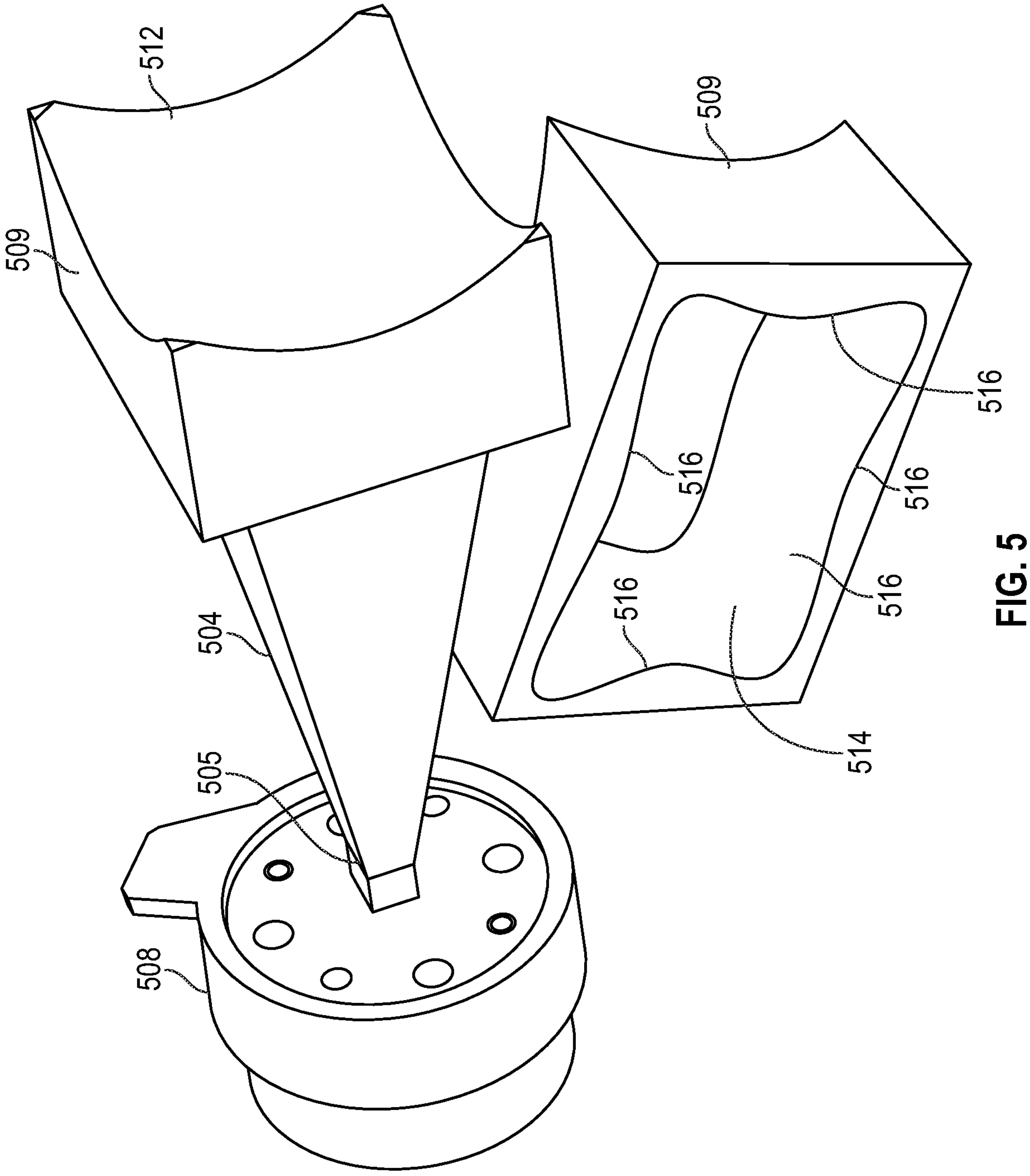
FIG. 5 is a perspective view a variable gain horn with a diverging lens connected to a distal end of a horn, and a diverging lens shown from a rear side according to a representative embodiment.

FIG. 5 is a perspective view a variable gain horn with a diverging lens connected to a distal end of a horn, and a diverging lens shown from a rear side according to a representative embodiment. Various aspects and details of discussed above in connection with FIGS. 1A-4 are common to the description of the presently described embodiments and may not be repeated to avoid obscuring the presently described representative embodiments.

As shown in FIG. 5, a horn 504 has a proximal end 505 and a distal end 507. The proximal end 505 is connected to a mount 508 and a feeder waveguide 511 connects the horn 504 to the source of the signals under test (not shown). At the proximal end 505, the horn 504 has an opening 510 having a shape and an areal dimension. In the present representative embodiment, the shape is square. This is merely illustrative and the shape at the opening 510 is contemplated to be other than square depending on the desired characteristics of the horn 504. Again, and as will be appreciated by one of ordinary skill in the art, in certain representative embodiments the horn 504 comprises a metal or an alloy. Other materials suitable for the horn 304 within the purview of one of ordinary skill in the art are contemplated. A diverging lens 509 having a concave region 512 is disposed over the opening 510 of the horn 504. Specifically, the distal end 507 of the horn 504 is disposed in a cavity 514 and is form fit (also known as friction fit) to the cavity 514. As will be appreciated, the distal end 507 of the horn 504 has shape adapted to fit into the cavity.

As shown, the shape of the outline of the cavity 514 may be similar to the shape of the opening 510 of the horn 504. In other representative embodiments, the shape of the outline of the cavity 514 is substantially the same as the shape of the opening 510 at the distal end 507 of the horn 504 is adapted to fit snugly (i.e., friction fit) into the cavity.

Various ways to provide a friction fit that provides an ample fit of the distal end 407 of the horn into cavity 514 are contemplated. Just by way of illustration, protrusions 516 may be provided along the perimeter of the cavity 514. These protrusions 516 are located and dimensioned to contact the opening 510 of the distal end 507 of the horn 504. Notably, the protrusions 516 are dimensioned and located to provide sufficient friction so the diverging lens 509 is suitably affixed to the distal end 507 of the horn 504, but not resulting in too much friction that attaching and removing the diverging lens 509 does not disturb the location of the components (e.g., the horn 504) so the function of the variable gain horn is unreasonably impacted.

As will be appreciated, and among other applications, this first mode of testing may be used to test the far field characteristics and performance in the real-life situations/the field. Just by way of illustration, consider the AUT 102 is a phased antenna array. Phased arrays comprise a plurality of channels, and in this first mode of testing, a comparatively reduced signal intensity is incident thereon. However, because the reflected signal 110 is substantially a full planewave fashion testing of the far field behavior of each of the channels of the phased array is more accurately emulated.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects and details of the present teachings may be embodied as an apparatus, method or computer program product. Accordingly, aspects and details of the present invention may take the form of an entirely hardware embodiment, an entirely software embodiment (including firmware, resident software, micro-code, etc.) or an embodiment combining software and hardware aspects and details that may all generally be referred to herein as a "circuit," "module" or "system." Furthermore, aspects and details of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

We claim:

1. A variable gain horn, comprising:

a horn adapted to transmit electromagnetic signals to an antenna under test, the horn comprising a proximal end adapted to receive the electromagnetic signals and a distal end adapted to transmit the electromagnetic signals; and a diverging lens adapted to be attached to the distal end of the horn by a form fit, wherein when the diverging lens is not disposed at the distal end of the horn, the variable gain horn without the diverging lens attached to the distal end transmits the electromagnetic signals at a higher directivity than when the variable gain horn with the diverging lens attached to the distal end.

2. The variable gain horn as claimed in claim 1, wherein the diverging lens has a front side and a rear side, and the front side has a concave shape.

3. The variable gain horn as claimed in claim 2, wherein the distal end of the horn has a shape, the rear side has a cavity having the shape, and the distal end of the horn is adapted to fit into the cavity.

4. The variable gain horn as claimed in claim 3, wherein the shape is a rectangle or a square.

5. The variable gain horn as claimed in claim 1, wherein the diverging lens comprises plastic.

6. The variable gain horn as claimed in claim 5, wherein the plastic comprises one of a nylon material, an acetal resin, or polyetheretherketone.

7. The variable gain horn as claimed in claim 1, wherein the lens has a thickness quantization on the order of a tenth of a wavelength of the electomagnetic signals or less.

8. The variable gain horn as claimed in claim 1, wherein when the diverging lens is not disposed at the distal end of the horn, the variable gain horn operates in a high-gain mode providing a comparatively large quiet zone.

9. The variable gain horn as claimed in claim 1, wherein when the diverging lens is disposed at the distal end of the horn, and the variable gain horn operates in a low-gain mode providing a comparatively high local signal to noise ratio (SNR).

10. The variable gain horn as claimed in claim 1, wherein the diverging lens comprises no fasteners exist between the diverging lens and the horn.

11. A system for testing antennae, the system comprising:

a variable gain horn, comprising: a horn adapted to transmit electromagnetic signals to an antenna under test (AUT), the horn comprising a proximal end adapted to receive the electromagnetic signals and a distal end adapted to transmit the electromagnetic signals; and a diverging lens adapted to be attached to the distal end of the horn by a form fit, wherein when the diverging lens is not disposed at the distal end of the horn, the variable gain horn without the diverging lens attached to the distal end transmits the electromagnetic signals at a higher directivity than the variable gain horn with the diverging lens attached to the distal end;

a parabolic mirror adapted to reflect the electromagnetic signals incident thereon from the variable gain horn to AUT.

12. The system as claimed in claim 11, wherein when the diverging lens is disposed at the distal end of the horn, the electromagnetic signals are reflected from a greater area of the parabolic mirror than when the diverging lens is not disposed at the distal end of the horn.

13. The system as claimed in claim 11, wherein a focus of the parabolic mirror is located at a phase center of the variable gain horn.

14. The system as claimed in claim 11, wherein the variable gain horn is adapted to move to locate the focus at the phase center of the variable gain horn.

15. The system of claim 14, further comprising an extender head connected to the variable gain horn, wherein the extender head moves the variable gain horn to the phase center.

16. The system as claimed in claim 11, wherein the diverging lens has a front side and a rear side, and the front side has a concave shape.

17. The system as claimed in claim 16, wherein the distal end of the horn has a shape, the rear side has a cavity having the shape, and the distal end of the horn is adapted to fit into the cavity.

18. The system as claimed in claim 17, wherein the shape is a rectangle or a square.

19. The system as claimed in claim 11, wherein the diverging lens comprises plastic.

20. The system as claimed in claim 11, wherein the diverging lens comprises no fasteners to be attached to the horn.

* * * * *